(12) United States Patent
Yoshida

(10) Patent No.: US 6,172,710 B1
(45) Date of Patent: *Jan. 9, 2001

(54) FRAME CONVERTER FOR ASYNCHRONOUS VIDEO SIGNALS

(75) Inventor: Kozo Yoshida, Kanagawa-ken (JP)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/159,992

(22) Filed: Sep. 24, 1998

(30) Foreign Application Priority Data

Sep. 26, 1997 (JP) .................................... 9-277926

(51) Int. Cl.⁷ ....................................... H04N 7/01
(52) U.S. Cl. ........................................... 348/478; 348/441
(58) Field of Search ................... 348/473, 476, 348/477, 478, 159, 153, 714, 715, 716, 705, 459, 558, 441

(56) References Cited

U.S. PATENT DOCUMENTS 4,109,276 8/1978 Kopkins, Jr. et al. .
5,150,212 * 9/1992 Han .
5,341,492 8/1994 Sakata .
5,526,050 * 6/1996 King et al. ............................ 348/387
5,661,527 8/1997 Ferguson ............................. 348/558
5,739,864 4/1998 Copeland ............................. 348/473

* cited by examiner

Primary Examiner—Nathan Flynn
(74) Attorney, Agent, or Firm—Gregroy L. Thorne

(57) ABSTRACT

An object of the invention is to realize a frame converter which successively can output an image signal in synchronous situation with a switching of asynchronous image signals by using a frame memory of which a number is smaller than of the inputted image signal. A frame converter according to the invention characterized by comprising, signal inputting means 11 and 12 for receiving image signals, identification signal assigning means 14 and 24 for assigning an identification signal to non-image area of the image signal from the signal inputting means for identifying the image signal, storing means 16 and 25 for storing the image signal form the signal inputting means for each frame, and signal outputting means 31 for outputting the image signal which is stored in the storing means by reading alternatively.

19 Claims, 3 Drawing Sheets

FIG. 3a
FIG. 3b
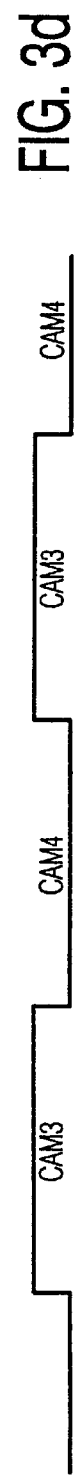
FIG. 3c
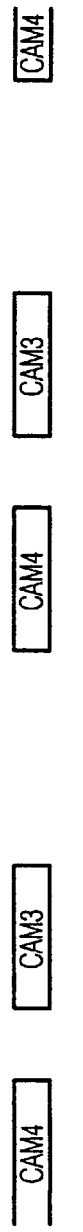
FIG. 3d
FIG. 3e
FIG. 3f
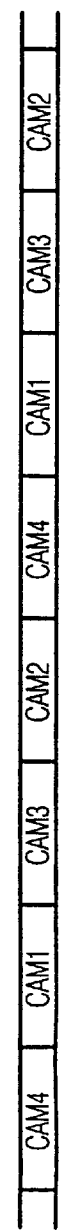
FIG. 3g
FIG. 3h

FRAME CONVERTER FOR ASYNCHRONOUS VIDEO SIGNALS

CROSS REFERENCE TO RELATED APPLICATIONS

This is a continuation of application Ser. No. 09/159,992 filed Sep. 24, 1998.

BACKGROUND OF THE INVENTION

The present invention relates to a frame converter which continuously outputs a plurality of image signals in a synchronized state while switching the respective asynchronous image signals.

A device called a video switcher which switches image signals from a plurality of cameras and the like and outputs the signals as one image signal is known. In switching such image signals, the input image signals from the cameras are often asynchronous with each other. The disturbance of synchronous signals in the output image signals is inconvenient.

In this case, all the input image signals are synchronized in advance by using a camera having a TBC (Time Base Corrector) function. Otherwise, asynchronous-isochronous conversion must be performed for each input by using a frame converting device having a frame memory. A camera having the TBC function is expensive, and therefore it is difficult to use the camera in a low-price system.

Further, in the frame converting device, the number of frame memories is the same as that of input image signals. While a image signal is stored into one of the frame memories, reading from another frame memory is performed. In the frame converting device having this construction, the number of frame memories must be the same as that of input image signals. This increases the price of the device.

SUMMARY OF THE INVENTION

The present invention has been made to solve the above-described problems, and has its object to realize a frame converter which continuously outputs a plurality of image signals in a synchronized state while switching the respective asynchronous image signals by using fewer frame memories than the number of the input image signals.

Accordingly, the present invention as a means of solving the problems is as follows.

The invention recited in claim 1 is a frame converter comprising: a plurality of signal input means respectively for receiving a plurality of image signals; identification signal supply means for supplying identification signals to discriminate the respective image signals to non-image areas of the image signals from said plurality of signal input means; a plurality of storage means for storing the image signals from said plurality of signal input means, respectively in frame units; and signal output means for alternately reading the image signals stored in said plurality of storage means and outputting the read signals.

The frame converter time-divisionally stores and reads respective plural image signals with respect to the plurality of storage means fewer than the input image signals while switching the signal input means and the signal output means at a predetermined timing, thus continuously outputs the image signals in a synchronized state while switching the asynchronous image signals. Further, as the apparatus stores the respective image signals, with identification signals, into the storage means, the respective image signals can be easily managed.

The invention recited in claim 2 is the frame converter according to the above-described invention (1), further comprising control means for switching said signal input means and said signal output means.

The invention recited in claim 3 is the frame converter according to the above-described invention (1) or (2), wherein said storage means store image signals at any timing within a period of continues frames.

The invention recited in claim 4 is the frame converter according to any one of the above-described inventions (1) to (3), wherein said storage means have independently operative input port and output port, and output an output image signal which is treated in storing operation.

BRIEF DESCRIPTION OF THE DRAWINGS

In the drawings:

FIG. 3 is a time chart for showing operating situation of the frame converter of FIG. 2.

DESCRIPTION OF THE PREFERRED EMBODIMENTS

Figure 1:
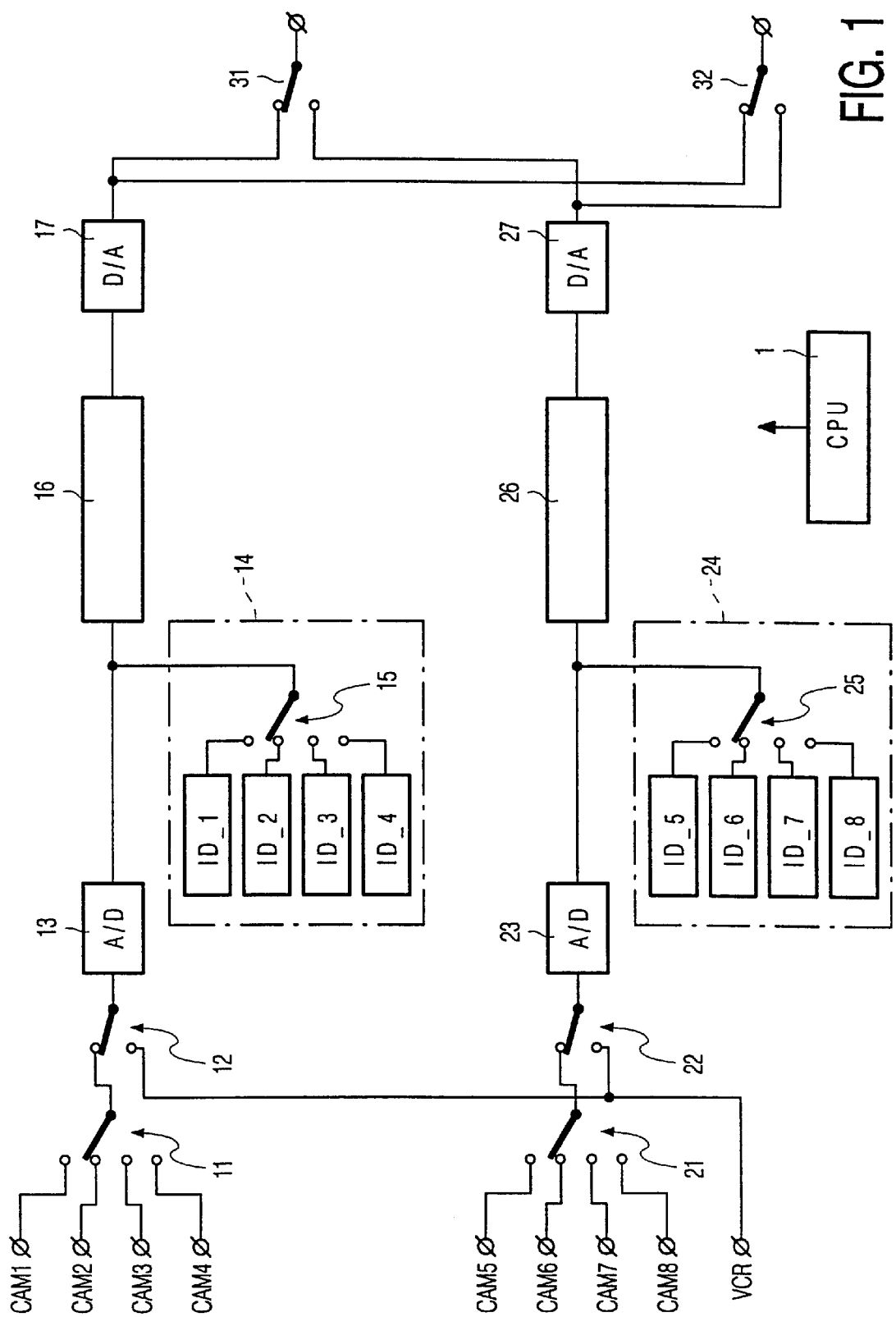
FIG. 1 is a block diagram of a first embodiment of a frame converter according to the invention.

FIG. 1 is a block diagram showing the construction of a frame converter according to respective embodiments of the present invention.

FIG. 1 shows two routes, i.e., a first route (route A) and a second route (route B). Each route has four inputs.

In FIG. 1, reference numeral 1 denotes a CPU as control means for controlling respective elements of the apparatus. The CPU 1 especially switching-controls respective switches and write/read controls storage means.

Numeral 11 denotes a switch as signal input means for changing input among four image signals of CAM1 to CAM4 (television cameras 1 to 4). Numeral 12 denotes a switch for selecting a image signal passed through the switch 11 or a image signal from an external video cassette recorder (VCR).

Numeral 13 denotes an A/D converter which converts the image signal passed through the switches 11 and 12 into a digital image signal.

Numeral 14 denotes an Identification signal assigning means which supplies an identification signal (ID1 to ID4) to a non-image area (vertical retrace period or the like) of the digital image signal so as to discriminate from which camera the signal comes. Note that the Identification signal assigning means 14 includes identification signal generators (ID_1 generator to ID_4 generator) for generating the respective identification signals and a switch 15.

Numeral 16 denotes a frame memory as storage means for storing a plurality of switched digital image signals respectively in frame units. Note that the frame memory 16 preferably is a dual port memory or the like having independently operative input port and output port.

Numeral 17 denotes a D/A converter which D/A converts the digital image signal read from the frame memory 16 into an analog image signal. Note that the switch 11 to the D/A converter 17 constructs the first route (route A).

Numeral 21 denotes a switch as signal input means for changing input among four image signals of CAM5 to CAM8 (cameras 5 to 8). Numeral 22 denotes a switch for selecting a image signal passed through the switch 21 or the image signal from the external video cassette recorder (VCR).

Numeral 23 denotes an A/D converter which converts the image signal passed through the switches 21 and 22 into a digital image signal.

Numeral 24 denotes an Identification signal assigning means which supplies an identification signal (ID5 to ID8) to a non-image area (vertical retrace period or the like) of the digital image signal so as to discriminate from which camera the signal comes. Note that the Identification signal assigning means 24 includes identification signal generators (ID_5 generator to ID_8 generator) for generating the respective identification signals and a switch 25.

Numeral 26 denotes a frame memory as storage means for storing a plurality of switched digital image signals respectively in frame units. Note that the frame memory 26 preferably is a dual port memory or the like having independently operative input port and output port.

Numeral 27 denotes a D/A converter which D/A converts the digital image signal read from the frame memory 26 into an analog image signal. Note that the switch 21 to the D/A converter 27 constructs the second route (route B).

Further, numeral 31 denotes a monitor output switch as signal output means for alternately reading and outputting image signals stored in the respective frame memories 16 and 26 by alternately selecting the route A and the route B.

Further, numeral 32 denotes a VCR output switch for outputting image signals for recording by the external VCR, as signal output means for alternately reading and outputting image signals stored in the respective frame memories 16 and 26 by alternately selecting the route A and the route B.

The frame converter having the above construction can output synchronized image signals by storing eight inputs of respective asynchronous image signals into two frame memories.

Figure 2:
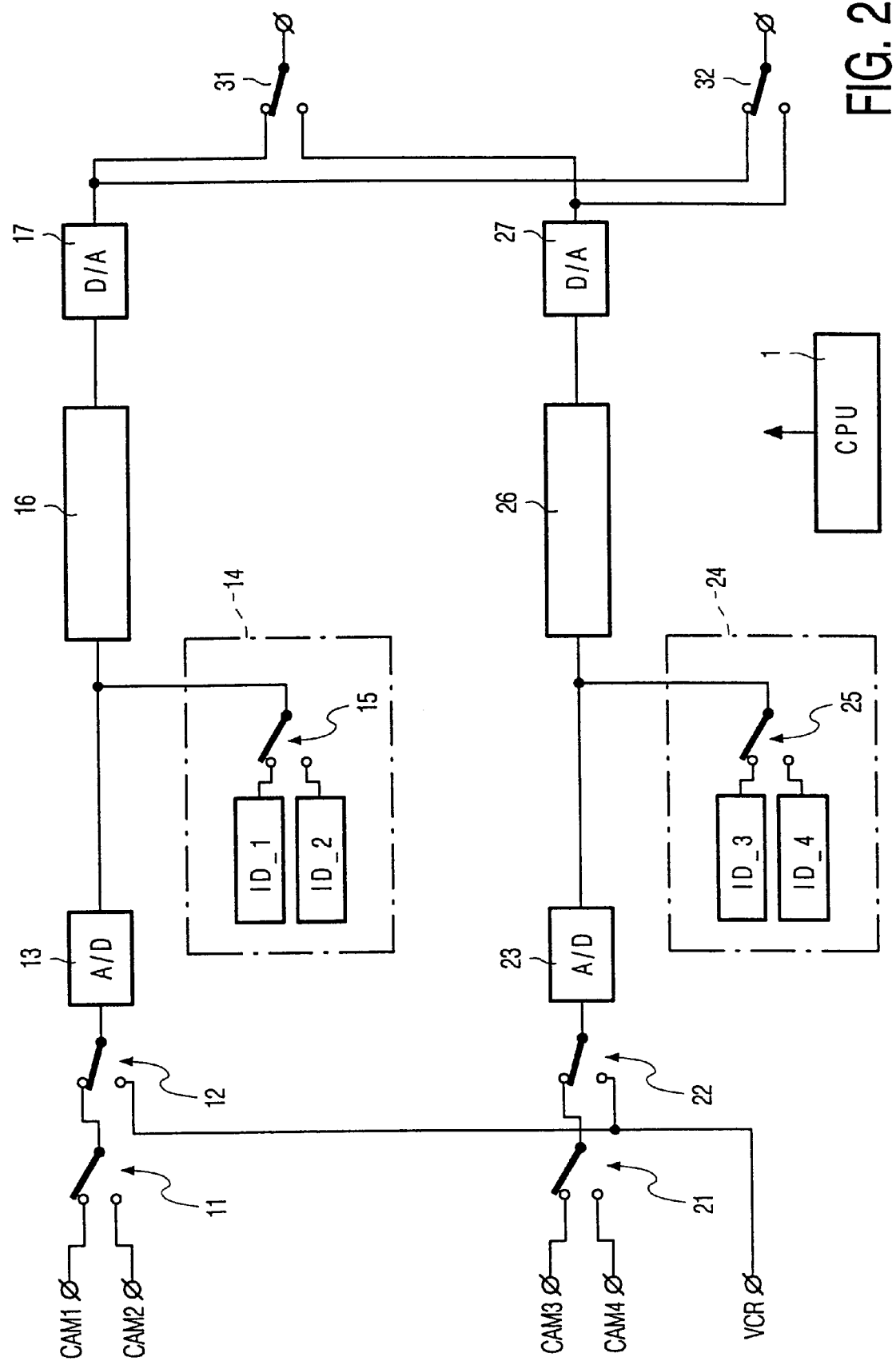
FIG. 2 is a block diagram of a second embodiment of a frame converter according to the invention.

Hereinbelow, the operation will be described with reference to a timing chart. Note that for the sake of simplification of explanation, description will be made using a frame converter shown in FIG. 2 for respectively two inputs, two routes and one output (four input and one output). In FIG. 2, the elements identical to those in FIG. 1 have the same reference numerals, and overlapped explanation will be omitted.

First, the CPU 1 generates a reference synchronizing signal to operate the respective elements. In this case, the reference synchronizing signal may be a synchronizing signal independent of the signals of CAM1 to CAM4 or may be a synchronizing signal synchronized with any of the signals of CAM1 to CAM4. In this case, a synchronizing signal of the signal of CAM1 is used as the reference synchronizing signal (FIG. 3(a)).

Then the CPU 1 supplies a select A signal to the switch 11 for changing the input in the route A. The select A signal is used to alternately select the image signal of CAM1 and the image signal of CAM2, in two-frame units.

Similarly, the CPU 1 supplies a select B signal to the switch 21 for changing the input in the route B. the select B signal is used to alternately select the image signal of CAM3 and the image signal of CAM4, in two-frame units. Further, the select B signal is one-frame phase shifted from the select A signal.

In this case, as the select A signal and the select B signal are switched in two-frame units, the asynchronous and inconstant timing image signal for one frame is included in any of two frame period.

First, when the switch 11 is on the CAM1 side in accordance with the select A signal (FIG. 3(b)), the image signal of CAM1 is passed through the switch 11 at timing within the two-frame period and converted by the A/D converter 13 into a digital image signal. Then, in parallel to this operation, the identification signal ID_1 from the switch 15, switched in accordance with the select A signal, is supplied to the retrace period of the digital image signal. The signal is stored into the frame memory 16 (CAM1 in FIG. 3(c)).

Further, when the switch 11 is on the CAM2 side in accordance with the select A signal, the image signal of CAM2 is passed through the switch 11 at timing within the two-frame period and converted by the A/D converter 13 into a digital image signal. Then, in parallel to this operation, the identification signal ID_2 from the switch 15, switched in accordance with the select A signal, is supplied to the retrace period of the digital image signal. The signal is stored into the frame memory 16 (CAM2 in FIG. 3(c)).

Further, when the switch 21 is on the CAM3 side in accordance with the select B signal (FIG. 3(d)), the image signal of CAM3 is passed through the switch 21 at timing within the two-frame period and converted by the A/D converter 23 into a digital image signal. Then, in parallel to this operation, the identification signal ID_3 from the switch 25, switched in accordance with the select B signal, is supplied to the retrace period of the digital image signal. The signal is stored into the frame memory 26 (CAM3 in FIG. 3(e)).

Further, when the switch 21 is on the CAM4 side in accordance with the select B signal, the image signal of CAM4 is passed through the switch 21 at timing within the two-frame period and converted by the A/D converter 23 into a digital image signal. Then, in parallel to this operation, the identification signal ID_4 from the switch 25, switched in accordance with the select B signal, is supplied to the retrace period of the digital image signal. The signal is stored into the frame memory 26 (CAM4 in FIG. 3(c)).

Further, reading from the frame memory 16 is performed at timing of the last one frame within the respective two frame periods of the select A signal, based on the synchronizing signal (FIG. 3(a)). That is, when the select A signal selects the signal of CAM1 in the last one frame period, the digital image signal of CAM1 is read from the frame memory 16 (CAM1 in FIG. 3(f)). Further, when the select A signal selects the signal of CAM2 in the last one frame period, the digital image signal of CAM2 is read from the frame memory 16 (CAM2 in FIG. (f)). Note that the read digital image signal is converted by the D/A converter 17 into an analog image signal.

Similarly, reading from the frame memory 26 is performed at timing of the last one frame within the respective two frame periods of the select B signal, based on the synchronizing signal (FIG. 3(a)). That is, when the select B signal selects the signal of CAM3 in the last one frame period, the digital image signal of CAM3 is read from the frame memory 26 (CAM3 in FIG. 3(g)). Further, when the select B signal selects the signal of CAM4 in the last one frame period, the digital image signal of CAM4 is read from the frame memory 26 (CAM4 in FIG. (g)). Note that the read digital image signal is converted by the D/A converter 27 into an analog image signal.

Then, the switch 31 is controlled to be switched for one frame in synchronization with the synchronizing signal (FIG. 3(a)). As shown in FIG. 3(h), as the monitor output, a image signal in a synchronized state for one frame, as CAM1→CAM2→CAM3→CAM4→. . . is outputted.

Further, the switch 32 is controlled to be switched for one frame in synchronization with the synchronizing signal (FIG. 3(a)). As shown in FIG. 3(h), as the VCR output, a image signal in a synchronized state for one frame, as CAM1→CAM2→CAM3→CAM4→. . . is outputted.

In this manner, the frame converter outputs sequentially switched image signals in a synchronized state by storing four inputs of asynchronous image signals into two frame memories.

Then, as the respective image signals are provided with the identification signals, by utilizing the identification signals, it is possible to superpose a camera number or the like on a displayed image, for example, on the display device side which receives the monitor output or the VCR device side which receives the VCR output.

Further, in the VCR device, it is possible to extract only a video image from a desired camera from a signal recorded on a tape.

Note that the description has been made as an example where four inputs of image signals are switched, however, even in case of eight inputs of image signals as shown in FIG. 1, image signals, sequentially switched in a synchronized state, can be outputted. Further, even if the number of inputs is greater, the operation can be made without any problem.

Further, in the example, the input image signals are in an asynchronous state, however, even if synchronous image signals are inputted, the operation can be made without any problem.

Further, the asynchronous image signals from cameras have been used as the signals of CAM1 to CAM4, however, devices which generate various image signals can be employed as well as the television cameras.

As described in detail above, the frame converter described in this specification time-divisionally stores and reads a plurality of image signals with respect to a plurality of storage means fewer than the input image signals while switching the signal input means and the signal output means at a predetermined timing. Thus, the apparatus continuously outputs the image signals in a synchronized state while switching the asynchronous image signals. Accordingly, a low-price frame converter can be realized. Further, as the respective image signals with the identification signals, are stored into the storage means, the respective image signals can be easily managed.

What is claimed is:

1. A frame converter, comprising:

signal inputting means for receiving asynchronous image signals;

identification signal assigning means for assigning an identification signal to a non-image area of the asynchronous image signals from the signal inputting means which identifies an asynchronous image signal;

storing means for storing the asynchronous image signals from the signal inputting means and the identification signal for each frame; and signal outputting means for frame converting the asynchronous image signals and outputting corresponding synchronous image signals and the identification signal which is stored on the storing means by reading alternatively.

2. A frame converter as claimed in claim 1 further comprising:

control means for switching the asynchronous image signals of the signal inputting means and the synchronous image signals of the signal outputting means.

3. A frame converter as claimed in claim 1, wherein the storing means stores the asynchronous image signal and the identification signal in a timing of one of the successive frames.

4. A frame converter as claimed in claim 1, wherein the storing means has an input port and an output port which can activate respectively.

5. A frame converter, comprising:

a signal input configured to receive asynchronous image signals;

a device configured to assign an identification signal to a non-image area of the asynchronous image-signal;

a memory configured to store the asynchronous image signal together with the identification signal; and a signal output configured to frame convert the asynchronous image signals and output corresponding synchronous image signals and the identification signal from the memory by reading alternatively.

6. The frame converter of claim 5, wherein the signal input is one of a plurality of signal inputs, with each configured to receive asynchronous image signals from a plurality of different sources, wherein the device is configured to assign a unique identification signal to each received asynchronous image signal, wherein the memory is configured to store each asynchronous image signal together with the corresponding unique identification signal, and wherein the signal output is configured to output each corresponding synchronous image signal and the corresponding unique identification signal from the memory.

7. The frame converter of claim 5, further comprising:

a central processing unit configured to switch the asynchronous image signals of the signal input and the synchronous image signals of the signal output.

8. The frame converter of claim 5, wherein the memory is configured to store the asynchronous image signal in a timing of one of the successive frames.

9. The frame converter of claim 5, wherein the memory has an input port and an output port which are configured to activate respectively.

10. A memory for a frame converter configured to store frames of asynchronous input signals containing image content and an identification signal in a non-image portion of the asynchronous input signal, and configured to frame convert the asynchronous image signals and output corresponding synchronous image signals.

11. The memory of claim 10, wherein the memory is configured to store frames of asynchronous input signals from a plurality of different sources, with each frame containing image content and a unique identification signal for each different source.

12. The memory of claim 10, wherein the memory is configured to store the frames in a timing of one of the successive frames.

13. The memory of claim 10, wherein the memory has an input port and an output port which are configured to activate respectively.

14. The frame converter of claim 1, wherein the frame converter is not synchronized to any of the asynchronous input signals.

15. The frame converter of claim 1, wherein the frame converter is synchronized to only one of the asynchronous input signals.

16. The frame converter of claim 5, wherein the frame converter is not synchronized to any of the asynchronous input signals.

17. The frame converter of claim 5, wherein the frame converter is synchronized to only one of the asynchronous input signals.

18. The memory of claim 10, wherein the memory is not synchronized to any of the asynchronous input signals.

19. The memory of claim 10, wherein the memory is synchronized to only one of the asynchronous input signals.

* * * * *